Patented May 11, 1948

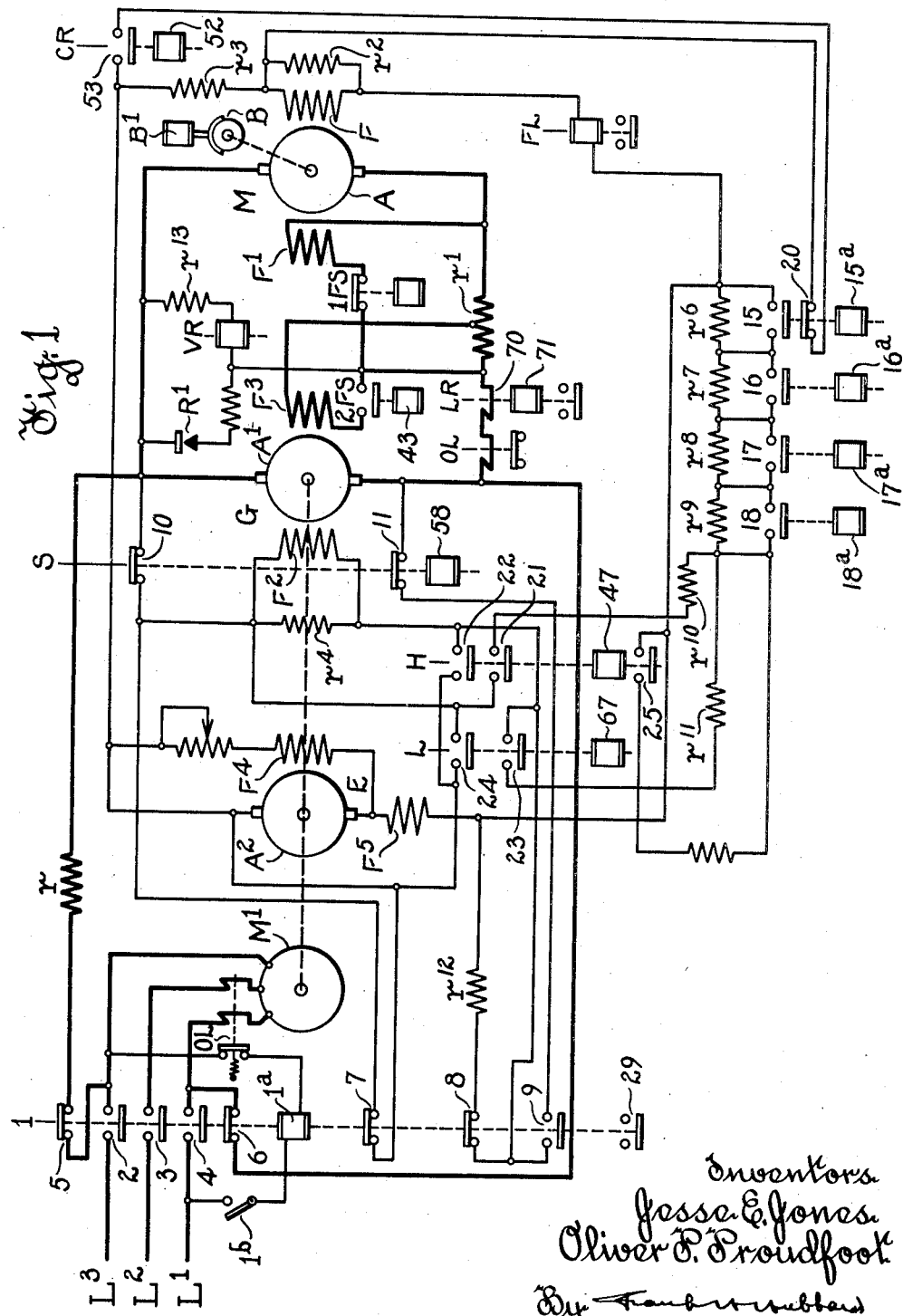

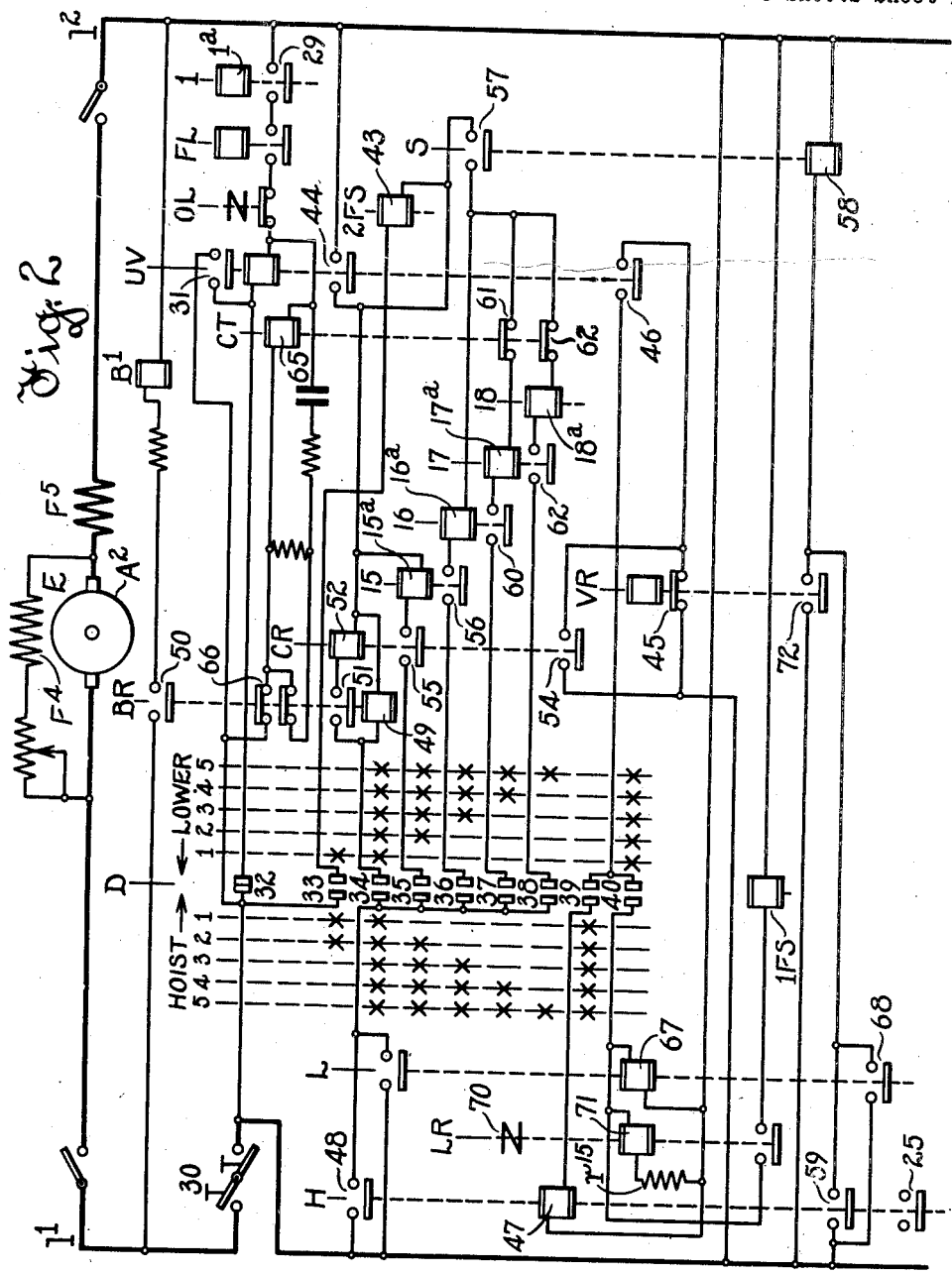

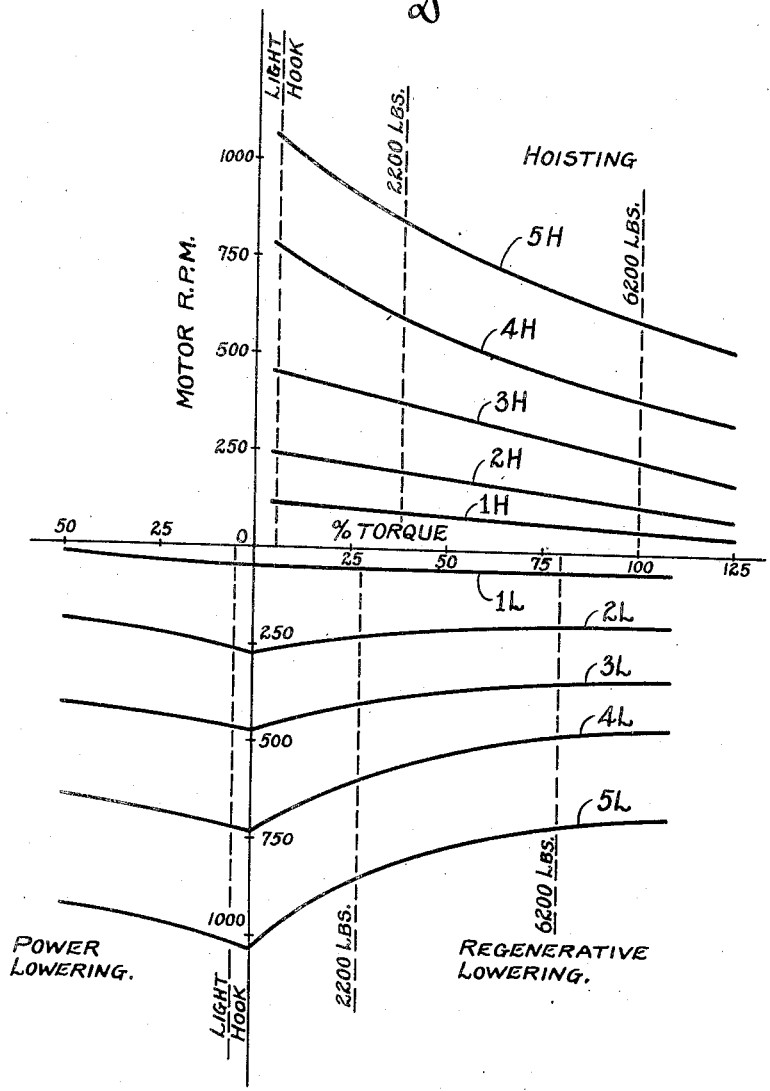

2,441,271

UNITED STATES PATENT OFFICE 2,441,271

VARIABLE VOLTAGE SYSTEM OF MOTOR CONTROL

Jesse E. Jones and Oliver P. Proudfoot, Wauwatosa, assignors to Cutler-Hammer, Inc., Milwaukee, Wis., a corporation of Delaware Application December 1, 1945, Serial No. 632,156

12 Claims. (Cl. 318—140)

This invention relates to improvements in variable voltage systems of motor control especially advantageous for hoists where the power supply is alternating current.

It has heretofore been proposed to provide for such service variable voltage control, and the present invention has among its objects to provide better and more reliable control of this character for the aforementioned and other service.

Another object is to provide a variable voltage system including means affording protection upon the occurrence simultaneously of failure of power and of the holding brake.

Another object is to enable in a system comprising an alternating current motor driving a generator to supply a direct current hoist motor, utilization of the voltage of the loop of the direct current machines to effect single phase energization of the alternating current motor for dynamic braking of the latter motor in case of failure of power and of the holding brake.

Another object is to afford in a system wherein the D. C. motor and generator are provided with series field windings novel control of such windings to enable highly advantageous speed torque curves to be obtained in both the hoisting and lowering quadrants.

Another object is to provide a system affording protection against plugging and maintenance of the regenerative or braking circuit subject to control by the voltage of the loop of the direct current machines, thereby to supplement the braking action of the usual friction brake.

Various other objects and advantages of the invention will hereinafter appear.

One embodiment of the invention is illustrated in the accompanying drawings which will now be described, it being understood that the embodiment illustrated is susceptible of various modifications without departing from the scope of the appended claims.

In the drawing,

Figure 1 is a diagrammatic view of the system exclusive of circuits for certain of the electroresponsive switches illustrated;

Fig. 2 is a diagrammatic view of control circuits for electroresponsive instrumentalities of Fig. 1, and Fig. 3 shows certain characteristic curves of the system illustrated.

Referring to Fig. 1, there is shown for driving a hoist or other machine a direct current motor M having an armature A provided with the usual friction brake B having a releasing electromagnet $B^1$. The armature A of motor B is connected in a closed loop with the armature $A^1$ of a direct current generator G driven by an alternating current motor $M^1$ supplied from an alternating current circuit $L^1$, $L^2$, $L^3$. Also Fig. 1 shows an exciter E having its armature $A^2$ operatively connected to the motor $M^1$ to be driven thereby together with the armature of generator G. The exciter E has a shunt field winding $F^4$ and a series field winding $F^5$.

The alternating current motor $M^1$ preferably is of the squirrel cage type having its primary connected to the supply lines $L^1$, $L^2$ and $L^3$ through an electroresponsive switch I, the connections for two terminals of the motor being shown as including windings of an overload relay OL. The line connections for the terminals of motor $M^1$ are adapted to be completed by normally disengaged sets of contacts 2, 3 and 4 of switch I, while on the other hand the outer terminals of the motor $M^1$ have connections through normally engaged sets of contacts 5 and 6 to the armature terminals of generator G. Such connections of the motor $M^1$ to the generator provide for single phase direct current excitation of motor $M^1$ for dynamic braking action, as will later be explained, and such connections include a resistor r shown as located between one terminal of the generator armature and contacts 5 of switch I. Switch I constitutes a starter for the motor $M^1$ and may be controlled in any preferred way. For illustration the winding $I^a$ of switch I has been shown as having a circuit across lines $L^1$ and $L^3$ controllable by a manual switch $I^b$ and extending through the contacts of the overload relay OL.

The direct current motor M has a shunt field winding F and a series field winding $F^1$ which is connected across a resistor $r^1$ in the loop including the armature of motor M and generator G. The series field winding $F^1$ is included in circuit by a normally closed electroresponsive switch IFS to be controlled as hereinafter set forth to disconnect said winding. Here it is to be noted that this connection of the series field winding across a series resistor is advantageous in disconnecting said winding. The shunt field winding F of motor M which is shunted by a resistor $r^2$ is connected to one terminal of the armature of exciter E through a resistor $r^3$ and is connected to the other terminal of said exciter armature through the coil of a field failure relay FL and a series field winding $F^5$ of said exciter. The resistor $r^3$ is adapted to be shunted by an electroresponsive switch CR in conjunction with contacts of a switch hereinafter specified.

The generator G has a shunt field winding $F^2$ to be connected to the exciter E by electroresponsive hoisting and lowering switches H and L which are operable selectively to provide for reversals of the connections between winding $F^2$ and exciter E. Winding $F^2$ of the generator is shunted by a resistor $r^4$ and is adapted to be connected across the terminals of the armature of generator G by an electroresponsive switch S and switch I jointly. More specifically, the upper terminal of field winding $F^2$ is connected to the generator by normally engaged contacts 10 of switch S, while the opposite terminal of said field winding is connected to the generator by normally engaged contacts 11 of switch S and contacts 9 of switch I jointly. Also the generator is provided with means to vary the excitation of its field winding $F^2$ as hereinafter set forth, and said generator is provided with a series field winding $F^3$, such field winding being normally out of circuit but adapted to be connected across a predetermined part of resistor $r^1$ by an electroresponsive switch 2FS.

The excitation varying means for the generator field winding $F^2$ comprises series resistors $r^6$, $r^7$, $r^8$ and $r^9$ adapted to be shunted by electroresponsive switches 15, 16, 17 and 18, respectively, the switch 15 having normally engaged contacts 20 which jointly with the relay CR control the short-circuit for resistor $r^3$ in circuit with the shunt field winding of motor M. When the circuit of the shunt field winding $F^2$ of the generator is completed by the hoist switch H said circuit also has included therein in addition to the resistors aforementioned a fixed resistor $r^{10}$ for which is substituted a fixed resistor $r^{11}$ when said circuit is closed by the lowering switch L instead of the hoist switch H. With the hoist switch H closed circuit extends from the upper terminal of field winding $F^2$ through contacts 21 of switch H through resistors $r^{10}$, $r^9$, $r^8$, $r^7$, $r^6$ to the lower terminal of exciter E, whereas circuit extends from the lower terminal of field winding $F^2$ through contacts 22 of switch H to the upper terminal of exciter E. On the other hand, when switch L is closed its contacts 24 connect the upper terminal of winding $F^2$ to the upper terminal of the exciter while its contacts 23 connect the lower terminal of winding $F^2$ to the lower terminal of the exciter through the aforementioned resistors except for substitution of the resistor $r^{11}$ for the resistor $r^{10}$. A resistance shunt for all of resistors $r^6$ to $r^9$ is provided by auxiliary contacts 25 of hoist switch H, the purpose of which will be understood.

With the switch I open to disconnect the alternating current motor $M^1$, the generator field winding $F^2$ is connected across the exciter terminals through a resistor $r^{12}$ by the contacts 7 and 8 of switch I. The terminal relationship of the winding $F^2$ and the exciter is then the same as that effected by the lowering switch L. Additionally Fig. 1 shows the coil of a voltage relay VR connected across the generator and motor loop through a resistor $r^{13}$, and having a resistance shunt including a rectifier $R^1$.

Hoisting involves inclusion of the series field winding of the motor on all hoisting points and preferably inclusion of the series field winding of the generator on hoisting point 1 and possibly other hoisting points, the series field winding of the generator being excluded on all other hoisting points. Such inclusion of the generator series field results in its action accumulatively to reduce the slope of the speed torque curve on the first point, this being very desirable as it permits of positive hoisting with full load without sacrificing a slow cable takeup and light line hoisting speed. On the other hand, in lowering the series field winding of the generator is included in circuit on the first lowering point to act accumulatively for power lowering, and differentially for regenerative lowering, said generator field winding being excluded from circuit on all other lowering points. This is advantageous in providing a substantially constant lowering speed on the first lowering point regardless of load, whereas for all other lowering points drooping speed torque curves are desired and are obtained by including the series field winding of the motor. More specifically the series field winding of the motor is included on all lowering points where the load is heavy but is excluded from circuit by the load relay LR under light load conditions. In consequence of such control of the series field winding the very advantageous set of speed torque curves shown in Fig. 3 is obtainable.

Another important feature of the system which will be understood without reference to the more detailed showing of Fig. 2 is the protection afforded in the event of both failure of power and of the mechanical brake. With the arrangement shown in Fig. 1 failure of power on lines $L^1$, $L^2$, $L^3$ releases switch I and said switch thereupon effects setting of the motor brake B as will later appear, and connects one phase of the alternating current motor $M^1$ across the generator, as heretofore explained, through contacts 5 and 6 of switch I. The consequent D. C. excitation of one phase of the motor primary of motor $M^1$ causes said motor to develop a braking or retarding torque and simultaneously the shunt field winding $F^2$ of the generator is subject to full excitation, being under such conditions connected directly to the exciter terminals through resistor $r^{12}$. Thus braking torque on the motor generator set is maintained and at the same time dissipation of the regenerative power from the motor at a controlled rate is provided for whereby the load is lowered at a controlled speed even though the friction brake B may have failed completely. It has been found that with full load the lowering speed is thus reduced to a safe value, whereas with a light load the lowering speed is proportionally less.

Referring to Fig. 2, it shows a drum type controller D and a customary low voltage relay UV having its winding initially connected across exciter lines $l^1$, $l^2$ through the contacts of relay OL and FL and auxiliary contacts 29 of switch I (Fig. 1) by a manual switch 30 and contacts 32 of the drum which are engaged only in the off position of the drum, said relay having maintaining contacts 31 paralleling the contacts 32 of the drum. The drum has additional sets of contacts 33 to 40, each set being disengaged in the off position of the drum but being engaged in the drum positions indicated by crosses. Thus in the first hoisting position of the drum it engages its sets of contacts 33, 34 and 39. Drum contacts 33 complete circuit from line $l^1$ through switch 30 to and through contacts 33 to winding 43 of switch 2FS, and thence through contacts 44 of relay UV to line $l^2$. This energizes switch 2FS to connect in circuit the series field winding $F^3$ of generator G. Drum contacts 39 complete circuit from line $l^1$ through contacts 45 of relay VR and contacts 46 of relay UV through contacts 39 to and through the winding 47 of the hoist switch H to line $l^2$. Switch H is thus energized to effect proper excitation of the generator field winding $F^2$ for hoisting operation, and switch H in responding through its contacts 59 connects across lines $l^1$ and $l^2$ the winding 58 of switch S, said switch in responding disconnecting the generator shunt field $F^2$ from the terminals of the generator armature. Also switch H through its contacts 48 completes circuit from switch 30 to and through drum contacts 34 to and through the winding 49 of brake relay BR to line $l^2$ through contacts 44 of relay UV. The relay BR is thus energized to complete through its contacts 50 the circuit of the brake magnet $B^1$ and through its contacts 51 to connect the winding 52 of relay CR in parallel with the winding 49. Thus relay CR is energized to shunt through its contacts 53 and contacts 20 of switch 15 the motor field resistor $r^3$, and by its contacts 54 to shunt contacts 45 of relay VR. Thereupon so long as the drum remains in position 1 the system operates with the generator shunt field winding properly connected to the exciter, with the series field windings of both the motor and the generator included in circuit and with the motor field strengthened by exclusion of resistor $r^3$. Then when the drum is moved to its second hoist position the drum contacts 35 complete circuit from line $l^1$ through contacts 48 of the switch H, drum contacts 35, and contacts 55 of relay CR to and through the winding $15^a$ of switch 15 to line $l^2$ through the contacts 44 of relay UV. Switch 15 being thus energized short-circuits from the circuit of the generator shunt field resistor $r^6$ and through opening of its contacts 20 effects reinsertion of motor field resistor $r^3$. Also switch 15 through its contacts 56 connects the winding $16^a$ of switch 16 to drum contacts 36. Thus when the drum is moved to the third position the circuit of winding $16^a$ is completed, the connection of said winding to line $l^2$ extending through now closed contacts 57 of relay S and contacts 44 of relay UV. Energization of switch 16 short-circuits from the generator field circuit resistor $r^7$ and said switch through its contacts 60 connects winding $17^a$ of switch 17 to drum contacts 37. Thus the drum in its fourth hoist position connects winding $17^a$ through contacts 61 of relay CT in parallel with the winding $16^a$. Switch 17 upon responding short-circuits from the generator field circuit resistor $r^8$ and said switch through its contacts 62 connects the winding $18^a$ of switch 18 to contacts 38 of the drum. Thus when the drum is moved to its fifth hoisting position it connects the winding $18^a$ through the contacts 63 of relay CT in parallel with the winding $17^a$ and switch 18 in responding short-circuits from the generator field circuit resistor $r^9$.

In lowering, the drum in its first position engages contacts 33 and 34 and 40 to establish the same connections as those established in the first hoisting position except for establishing through contacts 40 a circuit for the winding 67 of the lowering switch L instead of the winding of the hoist switch H. Thus in the first lowering position the polarity of the generator shunt field winding $F^2$ is reversed and the series field windings of both the motor and generator are included in circuit. Also switch S is energized through contacts 68 of switch L which parallel contacts 59 of switch H, thus disconnecting the generator shunt field from the generator armature. As in the case of hoisting, the drum in its first position energizes the brake releasing electromagnet 49, causing release of the brake B and energization of the relay CR whereby when the drum is moved to its second, third, fourth and fifth positions it progressively energizes the switches 15, 16, 17 and 18. Meanwhile the drum D by disengaging its contacts 33 when moved beyond its first lowering position deenergizes switch 2FS to disconnect the generator series field winding $F^2$. The motor series field winding remains in circuit in all lowering positions of the drum unless excluded from circuit by the load relay LR, which relay in addition to the series coil 70 shown in Fig. 1 has a coil 71 connected in parallel through a resistor $r^{15}$ with the winding 67 of lowering switch L. The windings 70 and 71 of the load relay coact to close relay LR under positive load lowering, and said relay in responding engages its contacts to energize switch 1FS, as will be apparent, thereby disconnecting the series field winding $F^1$ of motor M.

Acceleration and deceleration of motor M by shifting the drum to make and break the circuits of switches 15 to 18 involve no abrupt change in motor torque because of the inductive time lag of the generator field which controls the rate of change of the generator voltage applied to the armature of motor M. Consequently delayed action of the accelerating switches is not provided for except in respect of the third and fourth accelerating switches if required to meet the condition of quick movement of the drum from off position to full speed position. The relay CT serves to insure against response of switches 17 and 18 pending lapse of a given time interval initiated by movement of the drum from off position through first speed position, hoisting or lowering. It will be noted that the winding 65 of relay CT is as the result of closure of manual switch 30 connected across lines $l^1$ and $l^2$ through normally closed contact 66 of brake relay BR whereby relay CT is energized at the time the drum leaves off position, and relay CT when energized disconnects the windings of switches 17 and 18 from line $l^2$. Thus relay CT must release before switches 17 and 18 may be energized and the winding of said relay is shown as provided with a resistance and capacitance shunt which as will be understood delays release of said relay for a given period of time after interruption of the energizing circuit of said relay by response of brake relay BR.

As the voltage relay VR through its contacts 72 parallels the contacts 59 and 68 of switches H and L it maintains switch S energized after opening of switch H or L, as the case may be, until the voltage of the loop of the direct current machines is reduced to a low value. Thus regenerative circuit connections are maintained to supplement the action of the friction brake until the voltage of said loop attains the aforementioned reduced value. Moreover since the energizing circuit of each switches H and L is dependent upon release of relay VR to engage its contacts 45, or alternatively upon energization of relay CR, which in turn is dependent upon energization of one of the switches H and L, it will be apparent that plugging is prevented pending reduction of the loop voltage to release relay VR following release of either switch H or switch L.

No provision is made for protection against single phase operation of motor $M^1$ because it has been found that if the motor $M^1$ is properly selected it will upon single phase operation develop sufficient torque to permit continued safe operation of the system and it will do so without dangerous overheating. On the other hand, the system will not start if there is phase failure when starting is attempted. Reverse phase condition also is inherently rendered unharmful as it will result in starting the motor generator set in a direction rendering the exciter incapable of building up voltage, wherefore operation of the system is blocked.

In case of failure of the field of motor M, the relay FL having contacts in series with the winding of the low voltage relay UV will not respond, or if it does respond will release, thereby blocking operation of the system.

Whenever the switch I releases to disconnect A. C. motor M¹ its contacts 29 disengage to deenergize relay UV, thus bringing about deenergization of all electroresponsive switches dependent upon relay UV including the brake relay, wherefore the friction brake then sets.

What we claim as new and desire to secure by Letters Patent is:

1. In a variable voltage system for hoists, in combination, a generator, a compound motor supplied thereby and having a series field winding, means to effect reverse operations of said motor by reversing the polarity of a field winding of said generator and to vary the excitation of said generator to provide for said motor a plurality of hoist and lowering speed points, and means associated with the former means to effect inclusion of said motor series field winding on all lowering points under overhauling load conditions.

2. In a variable voltage system for hoists, in combination, a generator, a compound motor supplied thereby and having a series field winding, means to effect reverse operations of said motor by reversing the polarity of a field winding of said generator and to vary the excitation of said generator to provide for said motor a plurality of hoist and lowering speed points, and means associated with the former means to effect inclusion of said motor series field winding on all lowering points under overhauling load conditions and to exclude said motor series field winding from circuit under power lowering conditions.

3. In a variable voltage system for hoists, in combination, a generator, a compound motor supplied thereby and having a series field winding, means to effect reverse operations of said motor by reversing the polarity of a field winding of said generator and to vary the excitation of said generator to provide for said motor a plurality of hoist and lowering speed points, and means associated with the former means to effect inclusion of said motor series field winding on all lowering points under overhauling load conditions and all hoisting points, the second mentioned means including means responsive to direction of load current through the armature of said motor to disconnect said motor series field winding from circuit for power lowering.

4. In a variable voltage system for hoists, in combination, a compound generator, a compound motor supplied thereby, each of said machines having a series field winding to be excluded from circuit under certain conditions, means to effect reverse operations of said motor by reversing the polarity of a field winding of said generator and to vary the excitation of said generator to provide for said motor a plurality of hoist and lowering speed points, and means associated with the former means to effect inclusion of said series field windings of both machines on the first lowering speed point and to exclude said generator series field winding on other lowering speed points while maintaining said motor series field winding in circuit under overhauling load conditions.

5. In a variable voltage system for hoists, in combination, a compound generator, a compound motor supplied thereby, each of said machines having a series field winding to be excluded from circuit under certain conditions, means to effect reverse operations of said motor by reversing the polarity of a field winding of said generator and to vary the excitation of said generator to provide for said motor a plurality of hoist and lowering speed points, and means associated with the former means to effect inclusion of said series field windings of both machines on the first lowering speed point and excluding said generator series field winding on other lowering speed points while maintaining said motor series field winding in circuit, the second mentioned means including load responsive means to exclude said motor series field winding from circuit under power lowering conditions.

6. In a variable voltage system for hoists, in combination, a compound generator, a compound motor supplied thereby, each of said machines having a series field winding to be excluded from circuit under certain conditions, means to effect reverse operations of said motor by reversing the polarity of a field winding of said generator and to vary the excitation of said generator to provide for said motor a plurality of hoist and lowering speed points, and means associated with the former means to effect in hoisting inclusion of said series field windings of both machines on certain initial speed points and thereafter excluding said generator series field winding while maintaining said motor series field winding in circuit throughout hoisting and to effect in lowering inclusion of said series field windings of both machines on the first speed point and on all other speed points excluding said generator series field winding while maintaining in circuit said motor series field winding under overhauling load conditions.

7. In a variable voltage system for hoists, in combination, a compound generator, a compound motor supplied thereby, each of said machines having a series field winding to be excluded from circuit under certain conditions, means to effect reverse operations of said motor by reversing the polarity of a field winding of said generator and to vary the excitation of said generator to provide for said motor a plurality of hoist and lowering speed points, and means associated with the former means to effect in hoisting inclusion of said series field windings of both machines on certain initial speed points and thereafter excluding said generator series field winding while maintaining said motor series field winding in circuit throughout hoisting and to effect in lowering inclusion of said series field windings of both machines on the first speed point and on all other speed points excluding said generator series field winding while maintaining in circuit said motor series field winding under overhauling load conditions, the second mentioned means comprising load responsive means responsive under power lowering conditions to exclude said motor series field winding.

8. In a variable voltage system, in combination, a generator, a compound motor supplied thereby, said motor having a series field winding to be excluded from circuit under certain conditions and said machines having their armatures connected in a closed loop; a resistor included in said loop and control means including an electroresponsive switch which when deenergized connects said motor series field winding across a predetermined portion of said resistor and which when energized disconnects said motor series field winding from circuit.

9. In a variable voltage system for hoists, in combination, a compound generator, a compound motor supplied thereby and having its armature connected with the armature of said generator in a closed loop containing a resistor, said machines having series field windings respectively to be connected across predetermined portions of said resistor, separate switches to so connect said field windings, means operable at will to effect reversals of the polarity of a field winding of said generator and to vary the excitation of said generator to provide for reverse operations of said motor at selected speeds, said means including control means for said switches to initiate both hoisting and lowering with said series field windings of both machines connected in circuit, and then in lowering to effect exclusion of said generator series field winding while maintaining said motor series field winding in circuit but subject to automatic exclusion under power lowering conditions.

10. In a variable voltage system a direct current motor, a direct current generator to supply power to said motor, said machines having their armatures connected in a closed loop, a polyphase alternating current motor for driving said generator, and means for connecting said polyphase motor to a polyphase circuit subject to disconnection therefrom automatically upon failure of power, said means upon so disconnecting said polyphase motor establishing connections between its primary and said generator for single phase direct current excitation of said polyphase motor primary by said generator, thereby to effect dynamic braking action of said polyphase motor.

11. In a variable voltage system, in combination, a direct current motor and a direct current generator having their armatures connected in a closed loop, a polyphase alternating current motor to drive said generator, a polyphase supply circuit, switching means to connect said polyphase motor to said supply circuit and to disconnect said polyphase motor from said supply circuit upon failure of power in said circuit, said means having contacts which upon disconnection of said polyphase motor connect certain of its primary terminals to the armature of said generator and which interrupt the last mentioned connections upon connection of said polyphase motor to said supply circuit.

12. In a variable voltage system, a direct current motor, a direct current generator, said machines having their armatures connected in a loop, an exciter, a polyphase alternating current motor affording a drive for said exciter and said generator, a polyphase supply circuit, means for connecting said polyphase motor to said circuit and upon failure of power disconnecting said motor and establishing connections between certain of its terminals and the armature of said generator, means including variable resistance means to connect a field winding of said generator to said exciter and to vary the excitation of said generator, and means to connect said generator field winding to said exciter exclusive of said variable resistance means automatically upon operation of the first mentioned means to disconnect said polyphase motor from said polyphase circuit.

JESSE E. JONES.
OLIVER P. PROUDFOOT.

REFERENCES CITED

The following references are of record in the file of this patent:

UNITED STATES PATENTS

| Number | Name | Date |
|---|---|---|
| 1,165,788 | Liljenroth | Dec. 28, 1915 |

FOREIGN PATENTS

| Number | Country | Date |
|---|---|---|
| 535,732 | Great Britain | Aug. 17, 1939 |